March 27, 1973  R. HELLER  3,723,232
BODIES OF LOW SPECIFIC GRAVITY
Original Filed March 17, 1967  2 Sheets-Sheet 1

INVENTOR:
RUDOLF HELLER

United States Patent Office 3,723,232
Patented Mar. 27, 1973

3,723,232
BODIES OF LOW SPECIFIC GRAVITY
Rudolf Heller, Mattackerstrasse 43, Zurich, Switzerland
Original application Mar. 17, 1967, Ser. No. 623,882, now Patent No. 3,598,672. Divided and this application Feb. 16, 1971, Ser. No. 115,644
Claims priority, application Switzerland, Mar. 23, 1966, 4,201/66; July 5, 1966, 9,763/66; July 12, 1966, 10,117/66; Oct. 20, 1966, 15,226/66
Int. Cl. B32b 3/12, 27/30
U.S. Cl. 161—68
4 Claims

ABSTRACT OF THE DISCLOSURE

Bodies of low specific gravity are produced by coating a mass of roundish hollow granules, such as expanded or swelled polystyrene granules, with a hardenable liquid binder material, mixing the mass of thus coated granules with a pulverulent solid material so as to adhere particles of the solid material to the coating, and hardening the hardenable binder coating. Shaped cellular structures are formed from the mass of hardenable binder-coated hollow granules having pulverulent material adhering to the coating, by compressing the mass during or prior to the hardening of the hardenable liquid binder material.

CROSS-REFERENCE TO RELATED APPLICATION

This is a division of application Ser. No. 623,882, filed on Mar. 17, 1967 and now U.S. Pat. No. 3,598,672.

BACKGROUND OF THE INVENTION

The present invention relates to shaped bodies of low specific gravity which consist essentially of a hollow shell formed of hardened binder material having solid particulate material incorporated therein and including in the interior, a plastic material which may be in the form of a hollow granule adhering to the inner face of the respective shell. The present invention is also concerned with a cellular structure comprising cell walls consisting of hardened binder material having incorporated therein solid pulverulent particles and including in substantially each cell of the cellular structure, either as a thin layer adhering to the inner face of the cell walls, or otherwise partly filling the interior of the cell, a plastic material which at least during the first stages of producing such structure was present in the form of discrete roundish hollow granules.

The present invention thus relates to bodies of low specific gravity and a method of producing the same. The product of the present invention may be a loose mass of roundish bodies, for instance of spheric or spheroid shape, which may be introduced as aggregate into a concrete-forming mass, a gypsum mass or other casting masses, in order to reduce the specific gravity or heat-conductivity thereof and/or to increase the mechanical strength thereof. The mass of roundish granules formed according to the present invention may also serve as additive as described above in place of the conventional roundish and porous granules of swelling clay. Granules of swelling-clay are available at relatively low cost and also possess considerable strength and shape-retention; however, they have a specific gravity of between about 0.9 and 1.5 and thus are relatively heavy. Furthermore, they possess considerable heat conductivity. In addition, swelling clay granules are capable of absorbing water more or less like a sponge. Thus, for instance, building walls of concrete including swelling clay granules as an additive dry only very slowly and, under unfavorable climatic conditions, will become moist again. In moist condition, the heat-conductivity and heat capacity of granules of swelling clay is of the same magnitude as that of concrete formed without such additive.

If granules of swelling clay are introduced as additive into foamed masses, for instance of polystyrene or hardenable urethane foam, in order to reduce costs or to increase strength or two improve acoustic insulation, the addition of swelling clay granules will increase the specific weight and heat-conductivity of the foamed structure to such a large extent that the introduction of swelling clay granules into such lightweight building elements is generally completely impractical.

Furthermore, a loose flowable mass of roundish granules of very low specific gravity, as obtained in accordance with the present invention, may be used as filler material for the filling of cavities, for instance in structural elements, for the purpose of obtaining heat-insulating properties. The loose mass which may be produced in accordance with the present invention thus will replace comminuted cork or bricks.

The term "roundish" is used throughout the present specification and claims to define a curved, more or less spherical or spheroid configuration. The shape of the granules of the loose mass which may be obtained in accordance with the present invention will more or less depend on the foamed material which is utilized in the process, for instance swelled polystyrene granules. When replacing comminuted cork or bricks as filler material, it is an advantage of the granular mass produced according to the present invention that the same will not absorb water and is of very low specific gravity. Furthermore, filler materials of vegetable origin, such as comminuted cork, tend to rot when exposed to moisture for long periods of time, and this danger obviously does not exist when utilizing the granular mass of the present invention.

The granular mass of the present invention is also eminently qualified for replacing spun rock wool or spun glass fibers as a filler material and will not be subject to the disadvantage connected with the use of the last-mentioned conventional filler materials, namely the tendency to felt and bake together and thereby to lose heat-insulating capacity. Furthermore, the flowable granular mass of the present invention can be much more easily introduced into the cavities which are to be filled therewith than fibrous material and the like.

For the above-described and other purposes there exists a great need for a loose granular uniform material of very low specific gravity and correspondingly little heat-conductivity, which material should absorb very little water, should not be subject to decomposition under unfavorable climatic conditions, but should at the same time possess a relatively considerable mechanical strength and shape-retention. Thus, the desired granular material should not be squashed when exposed to a low degree of elevated pressure as would be the case with, for instance, exfoliated mica or swelled polystyrene granules which have not been processed according to the present invention. Furthermore, the granular material should not be subject to destruction when exposed to contact with certain solvents such as acetone.

A field of application of the bodies of low specific gravity such as may be produced in accordance with the present invention, which is even more important from a technical and economic point of view, may be found in building elements, i.e. shaped bodies, for instance plates or other shapes, which, according to the present invention, may have a specific gravity as low as between about 0.1 and 0.3, a correspondingly excellent heat-insulating capacity but nevertheless relatively high strength and shape-retention even at temperatures above ambient temperature. The strength characteristics of the shaped bodies of low specific gravity are desired to correspond about to those of bodies formed by compressing mixtures of fibrous material and synthetic resins, or should be corresponding to those of concrete or brick walls.

It is known that such requirements basically are best met by hollow cellular structures, for instance sandwich structures, which comprise outer solid and tight shells which shells are filled with one or more hollow cellular structures, possibly including reinforcing elements.

Known compound structures including such hollow cellular elements, comprise, for instance, interior honeycomb structures formed of prefolded and stripwise connected cardboard, synthetic resin or metal foils, which are so arranged as to form six-edged hollow tubes, whereby the initially open frontal ends of the tubes are glued to outer shells or intermediate layers. Apart from the fact that honeycomb structures of this kind are resistant against tensile and pressure forces only in the direction of the honeycomb axes and show considerably less resistance against deforming forces acting in directions transverse thereto, the heat-insulating effect of such structures is not very good because unimpeded air convection is possible within the cells of the honeycomb structure from one end thereof to the other. In cases where a better heat-insulating effect is required, it has been attempted to overcome this disadvantage of the above-described conventional honeycomb structures by arranging plates of foamed material or of fibrous material at the opposite front ends of the honeycomb structure, or by filling the honeycomb structure with foamed material prior to closing the same. The production of such composite building elements with an inner honeycomb structure is generally economically possible only in the case of plates having parallel opposite surfaces which plates preferably are of relatively small thickness. This is particularly so because the frontal terminal planes of the honeycomb arrangements have to be cut in advance into the desired shapes and dimensions of the compound structure which is to be produced. In most cases, it is attempted to obtain the desired heat-insulating properties and the low specific gravity of a lightweight building element by filling the mold cavity for a cast or compressed body of desired shape with a foamable mass or blowable material and to cause foaming or blowing thereof in the closed mold, thereby also achieving a certain limited degree of strengthening of the thus formed cellular body. This method is carried out, for instance, with respect to intially liquid masses of synthetic material, for instance polyurethane which may be foamed in a mold, or with foamable or blowable granules of synthetic material, for instance polystyrene granules, which may be swelled upon application of heat, such as are available under the trade name "Styropor."

By using polyurethane, it is possible to obtain a hollow cellular structure with small cells which is relatively shape-retaining and load-supporting, however, only as long as the temperature does not rise substantially above 50° C. If the temperature rises beyond this range, softening of the material takes place and a potentially dangerous gas expansion.

On the other hand, polystyrene is sufficiently stable at temperatures of up to about 110° C., however even at lower temperatures the mechanical strength and shape-retention of cellular polystyrene bodies is much too small to permit the use of this material for load-carrying structural elements or for producing plates which during use will be exposed to mechanical stress. Only in cases where such material is covered on all sides with strong solid plates has a partial usefulness been found. These disadvantages cannot be remedied by embedding in the foamed material occlusion bodies of greater strength, for instance swollen clay granules.

Furthermore, it has been proposed to produce hollow cellular structures by introducing into a mold cavity a mixture of rigid hollow spheres and liquid hardenable binding agents, particularly if the mold cavity is at least partially lined with a foil which is destined to form the outer shell of the thus produced building element of cellular structure. The entire mass of hollow spheres and binding agents inside the foil lining of the mold is then subjected to pressure, which is maintained until hardening of the binding agent has been completed. However, it has been found that it is not easy to produce such stable hollow spheres on a large scale in a sufficiently economical manner, and, furthermore, particularly when using smooth-walled and substantially shape-retaining hollow spheres, the liquid hardenable binding material will tend upon pressing of the hollow spheres against each other to escape from the contacting portions of adjacent hollow spheres into the interstices therebetween and this results in an insufficient adherence of the hollow spheres to each other.

SUMMARY OF THE INVENTION

The present invention proposes shaped bodies of low specific gravity, produced by wetting a mass of discrete roundish hollow granules with a hardenable, preferably heat-hardenable, liquid binder material so as to cause substantially complete wetting of the outer surfaces of the granules and the formation of a coating of the liquid binder material thereon. This is followed by mixing the thus formed mass of wetted granules with a pulverulent solid material so as to adhere particles of the solid pulverulent material to the liquid binder coating on the hollow granules, in such a manner as to form on each of the hollow granules an outer shell which will consist of the coating of hardenable binder material and particles of the solid pulverulent material adhering thereto and at least partially embedded therein, and which outer shell encloses a nucleus constituted by the respective hollow granule.

Upon subsequent hardening of the hardenable binder material of the outer shell, granules are obtained which form a mass of shaped bodies of low specific gravity consisting of a plurality of roundish hollow bodies or granules, each comprising a hard outer shell consisting of the hardened binder material and the pulverulent material adhering thereto, and also including the plastic material of the initial hollow granule, for instance a foamed or blown polystyrene granule. The material of the polystyrene granule or the like may adhere as a thin inner layer to the inner surface of the outer shell, or may be disposed in the interior of the outer shell in some other manner, however, in any event, only partially filling such interior space.

It is also within the scope of the present invention to apply pressure during the hardening of the hardenable binder material so as to transform the mass of coated granules into a shaped coherent polyhedric cellular structure.

The cell walls of such cellular structure preferably are relatively thin down to about 0.05 mm., and the pulverulent material incorporated in the cell walls preferably has a maximum dimension somewhat smaller than the thickness of the cell wall and may be as small as about 0.01 mm.

The individual hollow granules, such as swelled polystyrene granules, which are initially subjected to being coated with the liquid hardenable binder material and the pulverulent material, may be of any desired size; but very good results are achieved with hollow granules having diameters of between about 2 and 8 mm.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
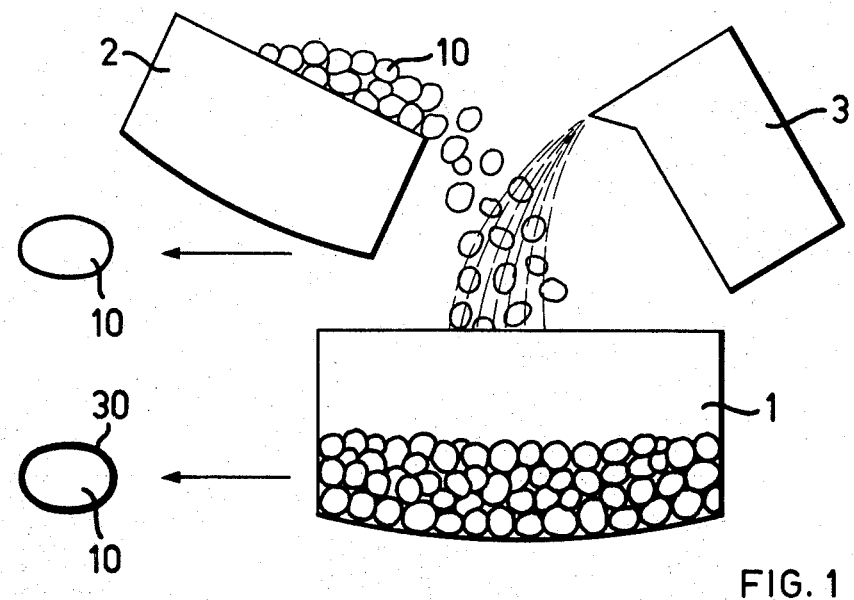
FIG. 1 is a schematic illustration of the first essential step in making the articles of the present invention, namely the wetting of the blown polystyrene granules with a hardenable liquid epoxy resin.

According to the present invention, hollow bodies of low specific gravity and the above-described desirable properties, particularly with respect to strength, shape-retention and resistance against chemical and atmospheric attacks, may be produced by wetting a loose mass of roundish foamed or swelled granules of synthetic material with a liquid hardenable binder material, for instance a mixture of an epoxy resin and a conventional hardener therefor, until at least nearly complete wetting of the entire surfaces of all foamed granules is achieved. Thereafter, solid particulate or pulverulent material is admixed to the mass of liquid-coated hollow granules until the liquid binder coating is at least substantially coated with pulverulent material. Thereby a dry loose mass is obtained consisting of roundish swelled graunles of synthetic plastic materal, for instance of polystyrene, each granule being covered by an outer shell consisting of the hardenable binder and solid particulate material adhering thereto and at least partially embedded therein.

Preferably, the swelled granules will consist of thermoplastic material which, at least at elevated temperatures below the softening point of the thermoplastic material, are resilient and which have a smooth rather than a rough surface. This assures, on the one hand, that the pulverulent particles can become partially embedded in the material of the granules, and on the other hand, that the granules are coated evenly over their entire surface.

In order to produce a loose mass of roundish hard-shelled granules of very low specific gravity as may be used as aggregate for casting masses or as filler material for the filling of cavities in structural elements or the like, as described further above, or also suitable for use as filler material for air filters or air humidifiers in air conditioning installations, the above-described dry and loose mass of coated swelled granules is exposed to heat, preferably in loose and moving condition, for instance by passing a stream of warm air therethrough. The heat serves for hardening of the hardenable binder material forming part of the outer shell of each granule. In this manner, roundish granules are obtained, each including a continuous closed outer shell consisting of hardened binder material with solid pulverulent material embedded therein. It is generally advantageous if in the interior of the shell the initial foamed granules are maintained and serve, in contact with the inner face of the shell, as a reinforcing element which will help to protect the outer shell against destruction under the influence of localized pressure or impact. However, if, for instance due to excessively high temperatures during the drying of the hardenable binder material or due to the presence of certain chemical substances in the binder material, wall portions of the swelled granules of plastic material are destroyed, the hollow shells which now surround the material of the foamed plastic granules will nevertheless be capable of fulfilling their above-described functions.

Thus, the present invention provides a loose, flowable granular mass on the basis of foamed or swelled granules preferably of synthetic resin which satisfies all of the above-discussed requirements and which consists essentially of roundish foamed granules of synthetic material, preferably roundish polystyrene granules which have been swelled to the maximum possible extent, whereby each of the swelled granules is encapsulated in a thin-walled closed roundish shell of hardened synthetic resin binder material with solid particles embedded therein or adhering to the outer face thereof. The flowable granular mass of the present invention as described above has the following characteristics:

(a) low weight per unit of volume which generally ranges from a maximum of 300 kg./m.$^3$ to a preferred weight of 100 kg./m.$^3$.
(b) considerable pressure-resistance and shape-retention of the individual granules which will prevent destruction of the same upon compression, transportation and mixing of the granular mass, for instance when incorporating the same into a concrete-forming mass.
(c) resistance against unfavorable climate conditions such as high humidity, extensive temperature changes and contaminations of the air.
(d) high resistance against microbes, insects and other biological pests.

It is also within the scope of the present invention to produce unitary bodies of cellular structure, low specific gravity and relatively high pressure resistance and shape retention, which cellular structures possess high resistance against climatic and chemical attacks. Such bodies can be produced by compressing the above-described dry and loose mass of foamed granules of synthetic material which are coated with a mixture of hardenable binder material and pulverulent solid material, under simultaneous hardening of the hardenable binder, so as to obtain a hollow cellular structure with interconnected hardened polyhedric cell walls and the material of the initial blown granules of synthetic material such as polystyrene located within the individual cells, preferably covering the inner faces of the walls of the individual cells.

Preferably, such body of cellular structure consists of a unitary arrangement of cell walls forming a plurality of at least substantially closed cells and consisting of the hardened binder material, preferably a synthetic material such as a hardened epoxy resin, and particles of pulverulent material embedded therein. Such pulverulent material, according to one preferred embodiment of the present invention, is mineral material such as quartz or chalk powder having particle sizes which generally are only slightly below the thickness of the cell walls, the latter preferably having a thickness of at least 0.05 mm. The individual polyhedric cells defined by the cell walls preferably are of substantially equal width, length and thickness, and each of these three main dimensions of the cells preferably is between about 2 mm. and 8 mm.

It will be understood that the above-described cellular structure possesses excellent strength and shape-retaining characteristics and is resistant against stresses exerted in all directions to an extent which may be comparable with the stress resistance of concrete and bricks. In addition, the cellular structure of the present invention is of very low specific gravity and correspondingly low heat-conductivity and, particularly if a high-quality binding agent which is stable at elevated temperatures of up to 200–300° C., has been used for producing the cell walls, the structure will maintain its strength and shape even at higher than normal surrounding temperatures and when exposed to extensive sun radiation. Furthermore, such cellular structure is not sensitive to moisture, does not form a nutrient medium for microorganisms, and will not be eaten up by animals, particularly insects, for instance termites.

Preferably, the swelled plastic granules will have an average diameter within the range of between 1 and 10 mm., however in extreme cases the average diameter may be smaller or also greater, for instance up to 100 mm.

Advantageously, loose, more or less strongly pre-swelled polystyrene granules, for instance granules having diameters of between 2 mm. and 8 mm., are used as the roundish foamed granules. Foamable polystyrene in granular form is commercially available, for instance, under the trade name "Styropor" and may be foamed by being immersed in hot water or exposed to superheated steam, to a foamed granular mass having a weight per liter of less than 0.01 kg. By blowing the granular polystyrene mass in an unconfined space, individual blown granules of approximately spheric or egg-shaped configuration and rather smooth surfaces are formed. Such blown polystyrene granules form an excellent heat-insulating material and are hydrophobic, i.e. they absorb practically no water and are highly resistant against water or biologic-organic decomposition as long as the temperatures does not rise above 100° C. However, these granules are not resistant against specific solvents, such as acetone. At higher temperatures or under the effect of specific solvents, the granules collapse and only a small amount of the residual material remains. Furthermore, the polystyrene granules are of low inflammability and generally are self-extinguishing when ignited.

The lack of shape-retention or the lack in mechanical strength of the blown polystyrene granules is important for the purposes of the present invention. If the blown polystyrene granules after having been wetted with a liquid binder and coated with the dry sand or pulverulent material are adhered to the liquid binder so that dry solid shells have been formed about each blown granule, are subjected to pressure, the initially roundish shaped polystyrene granules with the shells thereon will be deformed into polyhedrons which contact each other along relatively large surface areas. Thereby, the closely adjacent particles of solid material are partially compressed into the resiliently yielding surface of the polystyrene granule so that the liquid binder material cannot escape laterally or be pushed aside on pressure contact between adjacent polyhedrons, but will be squeezed outwardly between the adjacent solid particles. Thereby a mixture of liquid hardenable binding agent and solid particles is formed, and this mixture is then hardened by application of heat into a unitary polyhedric hollow cellular structure of considerable mechanical strength.

Suitable pulverulent materials include mineral sands of low porosity and low water absorption and metal powders which can be bound to the binder material, such as steel or aluminum.

A quartz sand with particle size of between 0.01 and 0.2 mm. has been found particularly suitable as the pulverulent solid material which adheres to the liquid binder coating. However, in order to avoid absorption of binder liquid other mineral and stone powders of more or less corresponding particle sizes, for instance impregnated chalk powder or ground ceramic fragments may be utilized. Highly suitable binder materials are epoxy resins which are used in liquid form with a suitable hardener admixed thereto, so that they will harden at the desired speed under the influence of elevated temperatures.

The hardenable binder materials must not give up gases during hardening. This condition is met, for instance by epoxy resin and polyester resin hardeners. The hardenable binder material may be applied in the form of a liquid or as a paste having a viscosity of up to SAE 10.

It is essential that the hardenable binder and the solid particulate or pulverulent material as well as the material of the initial swelled granules are compatible with each other so that the liquid binder will form a coherent coating on the swelled granules and the pulverulent solid material will be easily adhered to the liquid binder, thereby facilitating the formation of thin but mechanically highly stable hard shells. In certain cases it is advantageous to use as the pulverulent material a metal powder, for instance aluminum powder. This is particularly desirable if a somewhat higher degree of heat-transmission throughout the completed cellular structure is desired, or a higher degree of acoustic insulation, or a somewhat higher specific gravity.

With solid materials of somewhat larger particle size, for instance 0.1 mm., and by using a relatively small proportion of the liquid hardenable binder it will still be possible to obtain an average thickness of the walls of the hardened hollow cellular structure of the same magnitude and thus of a good average strength, as described above. By using more finely subdivided solid material and an even smaller proportion of liquid hardenable binder, a correspondingly less resistant hollow cellular structure of smaller cell wall thickness and even lesser specific gravity will be obtained. On the other hand, utilization of solid material of relatively coarse granules, for instance pulverulent material of a particle size of between about 0.2 and 0.4 mm. and of somewhat more viscous hardenable binder material in a larger proportion, will result in a hollow cellular structure having thicker cell walls and possessing higher mechanical strength. The heating of the coated mass of foamed granules in a mold under pressure may be carried out by placing the mold into a suitable furnace, or, for instance, by exposure to a high-frequency alternating electric field.

The hardening temperature in the case of swelled polystyrene granules preferably will be between 80 and 90° C., but will also depend on the characteristics of the hardenable binder material the speed of hardening of which will increase with incresing temperatures.

Since the hardening of the epoxy resin is an exothermic process and the heat produced thereby is only slightly absorbed by the foamed granules and cause, due to the low heat capacity of the granules a relatively quick rise in temperature, it frequently suffices to heat the compressed mass of coated foamed granules from the outside in order to progressively effect the heat-hardening of the hardenable resin throughout the interior of the mass. Generally it is preferred to carry out the compression of the loose mass of coated foamed granules, i.e., granules coated with the hardenable binder and the pulverulent material adhering thereto at pressures of at least 1 atmosphere above atmospheric pressure, so as to reduce the volume of the compressed mass to at most 75%, preferably between 50% and 60% of the initial volume of the loose mass of coated granules.

The amount of binder material preferably should be sufficient to fill the portion of the interstices between the swelled granules which is not taken up by the pulverulent material.

It is also possible without difficulty to incorporate into the loose mass of coated foamed granules prior to compression of the same solid bodies having dimensions larger than the dimension of the coated granules and consisting of material of higher specific gravity, such as swelled clay bodies, so that these occlusions will become integral with the hollow cellular structure during compression and formation of the same.

Primarily, it has been found advantageous to form during compression of the coated granular mass in the mold a compound structure consisting of the polyhedric cellular structure formed as described above and substantially planar, resistant and for instance smooth and suitably colored cover materials, such as plates, sheets, fouls, mats, for instance mats of synthetic resin impregnated glass or asbestos fibers, whereby it is frequently advantageous to wet these plates or the like prior to introduction into the mold with the liquid hardenable resin. It is also within the scope of the present invention to incorporate in the walls during the compression of the same connecting elements such as door fittings, screws, jointing members and the like, which may themselves act as or may be replaced by or be in addition to supporting or reinforcing elements which may be completely or partially embedded in the cellular structure so as to be integral therewith. Particular types of reinforcing elements are not part of the invention. On the other hand, it is also within the scope of the present invention to adhesively adhere a covering sheet material to the hollow cellular structure after completion of compression of the same and of hardening of the binder material thereof. Such covering material may be in the form of plates, sheets, foils, mats and the like.

Mold portions and inserted elements such as tubular cores which during compressing of the coated granules should not become part of the thereby formed cellular structure should be coated with conventional separating agents, for instance silicone or fluorocarbon-based products such as those commercially available under the trade name Teflon.

It is, for instance, possible, and frequently desirable, to insert tubular cores into the mold cavity and to pass heated fluids such as air or liquids through the tubular core in order to harden the hardenable binder constituent of the coating of the blown granules which are compressed to form a unitary cellular structure. Broadly, practically all conventional pressure casting techniques can be applied or adjusted for use in connection with the present invention.

The present invention also encompasses the compressed cellular body produced as described above, which body comprises polyhedric cell walls which are integral with each other and form practically closed cells. The cell walls consist essentially of hardened binder material with solid pulverulent particles embedded therein. Each of the cells defined by the cell walls will contain either blown granule of, for instance, polystyrene, which will form a thin layer on the interior face of the cell, or at least the material of such granule even though the same may no longer adhere to the inner surface of the cell. For the purpose of the present invention, it is of little consequence whether the initially present blown granule forms an inner layer on the cell-defining walls or whether the material of the granule, due to overheating or the effect of solvents or for other reasons, while still contained within the cell, no longer adheres to the inner face thereof. The strength of the unitary cellular body is primarily determined by the cell walls formed of the hardened binder and the pulverulent material embedded therein. Nevertheless, it is somewhat preferred to have the material of the initial swelled granule of synthetic material within the cell forming a layer on the inner face of the cell-defining walls.

The compressed unitary cellular body thus formed according to the present invention may be, during compression and hardening of the binder material, or subsequently, covered or adhesively adhered with planar cover layers, for instance aluminum or steel sheets or also plates of asbestos cement or any desired fibrous material-synthetic resin combination, or with foils of such or other material. Such cover layers may be applied during the compression and hardening of the binder material so that the adherence is effected by the hardening binder material, or the cover layers may be subsequently adhered to the unitary cellular body, or the unitary cellular body may be inserted into shells of cover material and preferably adhesively adhered thereto. In such cases, cover layers, for instance aluminum or steel sheet, or of asbestos cement plates, as well as glass fiber reinforced foils of synthetic resin act also as reinforcing elements by giving to the entire composite body comprising the unitary cellular structure and such cover layer not only a surface which is resistant against mechanical attack, but in addition the cover layer will also considerably improve the tension and the bending resistance of the hollow cellular structure.

It is also possible within the scope of the present invention to incorporate in the hollow cellular structure, during formation of the same by compression and hardening or subsequently thereto, connecting or supporting elements, for instance door fittings, screws, and the like.

It is sometimes of advantage to use profiled plates in combination with the hollow cellular structure, which profiled plates may be of undulating or sharp-edged ribbed shape. The mechanical strength, the heat-insulating and acoustic-insulating properties, the resistance against moisture and other corrosive influences can be adjusted, as desired, in so many different ways that the unitary hollow cellular structure of the present invention in the shape of a building element may, with or without cover layers and/or at least partially embedded reinforcing and other elements, used for self-supporting wall portions, windowsills, doors and door frames, thresholds, floor covering, ceilings, table tops, as a substitute for furniture-board and as roofing materials. Furthermore, the shaped unitary hollow cellular structures of the present invention, due to their high strength and low specific gravity, may also be used in the manufacture of machines and apparatus and for the construction of automobiles and other vehicles, particularly the body portions thereof.

Figure 2:
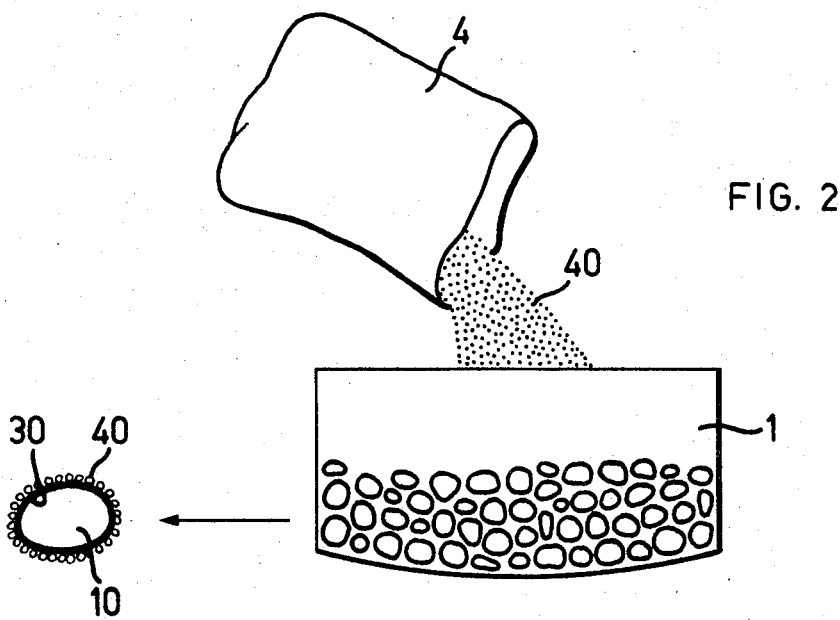
FIG. 2 is a schematic illustration of the second essential step in making the articles of the invention, namely the adhering of pulverulent solid material to the liquid binder-coated polystyrene granules.

Referring now to the drawing which in FIGS. 1 and 2 shows how the novel articles are made to facilitate understanding of the invention, and particularly to the schematic illustration shown in FIG. 1, swelled polystyrene granules 10 are introduced from a storage vessel 2 into a mixing container 1 provided with stirring equipment (not shown). Swelled polystyrene granules 10 are of roundish shape and have a weight of between about 5 and 10 grams per liter and an average diameter of between 3 and 6 mm. For each about 10–15 liters of blown polystyrene granules introduced into the mixing container 1, between about 250 and 300 grams of a liquid hardenable epoxy resin are introduced into the mixing container 1 from storage vessel 3. The hardenable liquid epoxy resin may be, for instance, of the type commercially available under the trade-name Araldit and will include the required hardening agent. The swelled granules and the hardenable liquid are intimately mixed by stirring with the stirring equipment until all of the granules 10 are evenly wetted and coated with a layer 30 of the liquid hardenable binder material.

Depending on the proportion of hardenable liquid binder and the viscosity, thereof, the coating of hardenable liquid binder material on the blown polystyrene granules will be of varying thickness. However, it is preferred that the average thickness of the liquid hardenable material coating will be between about 0.08 and 0.25 mm.

As shown in FIG. 2, to the thus coated granules in the mixing container 1, finely subdivided particulate material, here pulverulent material in form of quartz sand 40, is introduced and intimately mixed with the liquid-coated granules in container 1. Quartz sand 40 may be replaced with other suitable solid particulate materials, for instance impregnated chalk powder or metal powder, such as aluminum powder having a particulate size of between about 0.05 and 0.25 mm. The particle size of the particulate material preferably will be close to or somewhat below the thickness of coating 30. The amount of the particulate material which is admixed should be sufficient to cover the liquid binder coated blown polystyrene granules 10 with an outwardly dry, finely divided layer 40, the individual particles of which adhere to liquid binder coating 3.

If the thus produced doubly coated polystyrene blown granules, i.e. coated with the hardenable liquid binder material and the solid particulate material are then exposed to a stream of hot air in order to harden the liquid hardenable binder material, roundish extremely lightweight cellular granules with thin hard shells are formed which are excellently suitable as aggregate for incorporation into casting masses, as filler material for filling cavities in a variety of structural and other elements, or as similar material for air purification and air humidifying. The thus produced loose mass of hardened binder material coated polystyrene granules, furthermore provided with a cover layer of solid finely subdivided particles, is excellently suitable as filler material for producing a composite building plate, as illustrated in FIG. 3.

Figure 3:
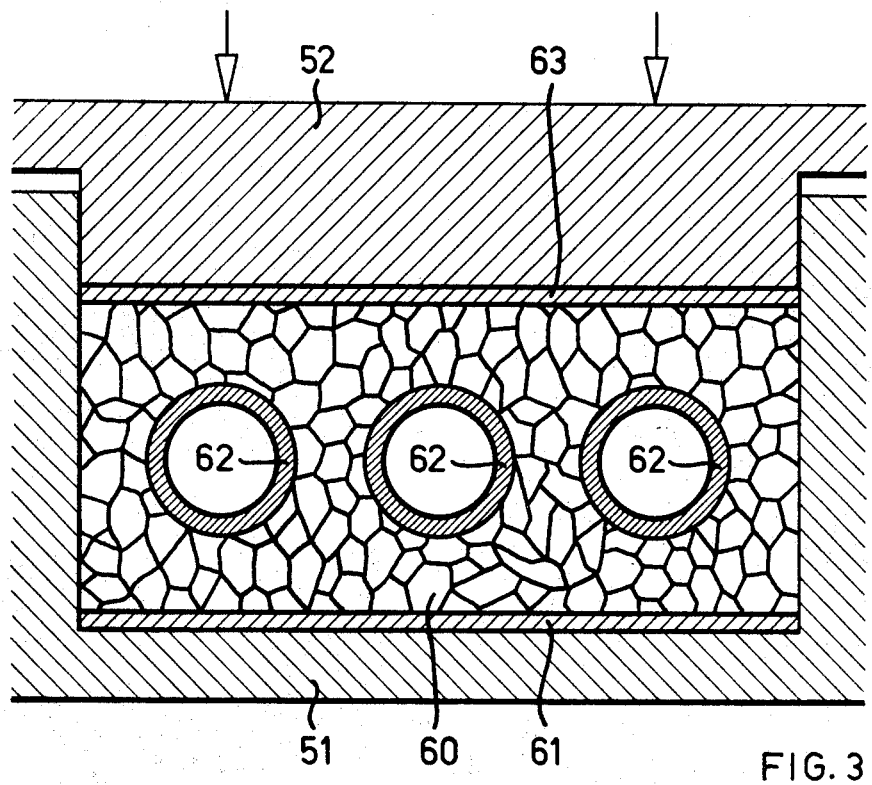
FIG. 3 is a schematic illustration of the compressing and hardening of the mass obtained according to FIG. 2.

FIG. 3 shows a mold cavity which is defined by mold members 51 and 52. The mold cavity has been filled successively with a lower metal sheet 61, tubular cores 62, a mass of filler material 60 which consisted of swelled polystyrene granules covered with layer or coating of set binder material and an outer layer of finely particulate solid material the particles of which are partially embedded in the hardened binder layer, such as the granule 10, 30, 40 illustrated in FIG. 2. Finally, on top of the mass of coated granules, an upper metal sheet 63 was introduced into the mold. Cover sheets 61 and 63 were previously coated at their faces directed towards the interior of the mold cavity with hardenable binder material. The entire contents of the mold are then compressed to less than one-half of their original volume, which can be accomplished with a gauge pressure of between about 1–5 atmospheres, assuming that the finished plate should have a thickness of about 6 cm. During such compression, the resiliently yielding polystyrene granules are deformed to polyhedric bodies contacting each other along relatively large surface portions. The plastic liquid hardenable binder material 30 is thereby squeezed outwardly between the solid particles 40, so that solid particles 40 become completely embedded in binder material 30. On the other hand, the sand or the like particles 40 will partially penetrate into the soft polystyrene walls of granules 10 and thereby will prevent the squeezing out of the still flowable hardenable binder 30 from between the contacting surface portions of adjacent granules. While maintaining pressure, mold 51, 52 and, if desired also tubular cores 62 are heated, for instance by passing heating fluid through tubular cores 62 so that the contents of the mold will be heated, for instance to a temperature of between 50–90° C., causing complete hardening of the hardenable binder material.

In this manner, a unitary, polyhedric hollow cellular structure is formed which is adhesively attached to metal sheets 61 and 63. The inner surface portions of the mold directly adjacent the material filling the mold and the outer face of tubular core 62 had been previously treated with separating agents, for instance silicone or the like, so that these mold portions can be easily separated from the compressed body formed in the mold. It may also be provided for heating the contents of the mold, after hardening of the binder material, for a short period of time to a higher temperature, for instance 130° C., whereby it will be achieved that the polystyrene granules within the interior of the individual hollow polyhedric cells will collapse and lose their resiliency.

Figure 4:
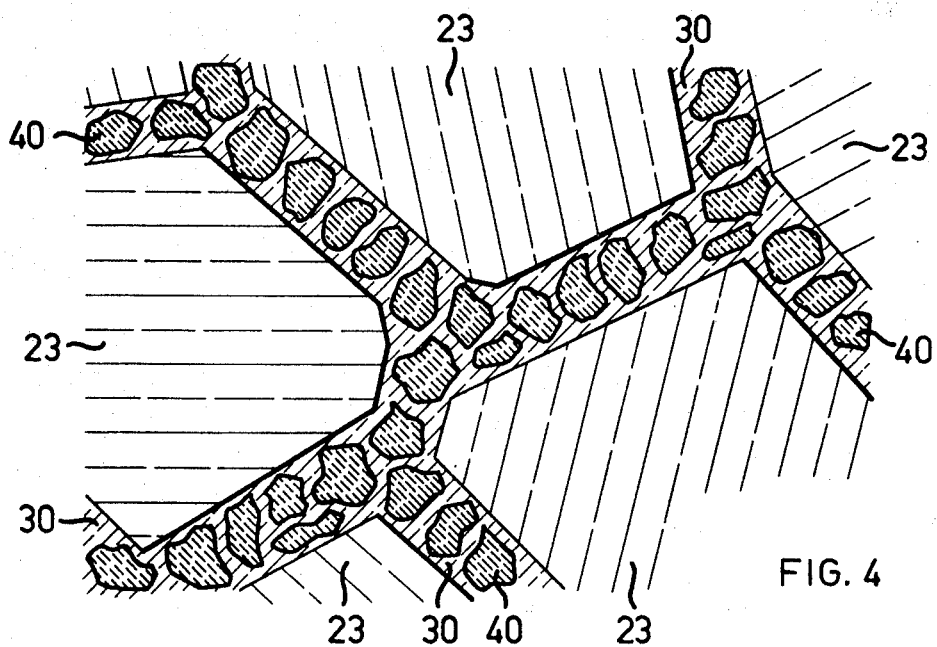
FIG. 4 is an enlarged schematic illustration of a section of the walls of the cellular structure obtained as illustrated in FIG. 3.

FIG. 4 is a fragmentary enlarged illustration of a portion of the cellular structure produced in mold 51, 52 as shown in FIG. 3.

The cellular structure, as shown in FIG. 4, consists essentially of cell walls which comprise the hardened binder material 30 with solid particles 40 embedded therein. Each of the polyhedric cell chambers 23 contains the material of one of the original blown polystyrene granules (not shown), which material, as described above, may either adhere to the inner face of the cell walls or may be collapsed.

The wall thickness of the swelled polystyrene granules, for instance, may be of the magnitude of 0.1 mm., and the weight per cubic meter of such swelled polystyrene granules preferably will be between 5 and 15 kg.

By way of example, for producing one cubic meter of the completed unitary cellular structure according to the present invention, there may be required:

12 kg. ±30% swelled Styropor granules of 2–8 mm. diameter,
60 kg. ±30% quartz powder of about 0.1 mm. particle size,
12 kg. ±30% epoxy resin with required hardener addition.

Thus the total weight will be 84 kg./m.$^3$±30%. The unitary cellular structure may be formed, as described further above, by compressing the binder-powder covered granules at a gauge pressure of about two atmospheres.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims:

1. A shaped cellular structural body, comprising a plurality of closed polyhedric cells bounded by respective coherent cell walls which together constitute a lightweight monolithic cellular structure, said cell walls all having a substantially uniform thickness between substantially 0.05 and 0.2 mm. and being composed of hardened binder resin and solid particles which are uniformly embedded therein and have diameters which are at most equal to said uniform wall thickness, said cells having in three mutually normal directions dimensions of between substantially 2 and 8 mm.; and a plurality of polystyrene foam beads, each tightly accommodated in one of said cells in polyhedrically compressed configuration.

2. A shaped cellular body as defined in claim 1, said monolithic structure having two major outer surfaces; and said body further comprising reinforcing and protecting sheet material elements overlying and connected with at least portions of said surfaces so as to form a sandwich panel with said structure.

3. A shaped cellular body as defined in claim 2, said monolithic structure having a given tensile and bending strength; and further comprising reinforcing elements fixedly connected with said structure and having tensile and bending strengths greater than said given tensile and bending strength of said structure.

4. A shaped cellular body as defined in claim 3; and further comprising anchoring means anchoring said reinforcing elements to said structure.

References Cited
UNITED STATES PATENTS

| | | | |
|---|---|---|---|
| 2,806,509 | 9/1957 | Bozzacco et al. | 161—162 X |
| 3,079,289 | 2/1963 | George et al. | 161—DIG. 5 |
| 3,476,841 | 11/1969 | Bienert | 264—45 |
| 3,503,841 | 3/1970 | Sterrett | 161—161 |
| 3,542,715 | 11/1970 | White et al. | 161—159 X |
| 3,677,874 | 7/1972 | Sterrett et al. | 161—160 X |
| 3,679,529 | 7/1972 | Prusinski et al. | 161—161 X |

HAROLD ANSHER, Primary Examiner

U.S. Cl. X.R.
161—DIG. 5, 161, 162